United States Patent
Harbisch

[15] 3,683,839
[45] Aug. 15, 1972

[54] SPRING-LOADED COUPLING FOR SEAGOING VESSELS

[72] Inventor: Heinrich Harbisch, Werftstr. 47, 4100 Duisberg, Germany

[22] Filed: Aug. 21, 1970

[21] Appl. No.: 65,992

[52] U.S. Cl. ............................................114/235 A
[51] Int. Cl. ............................................B63b 21/00
[58] Field of Search ..............114/235 R, 235 A, 77

[56] References Cited

UNITED STATES PATENTS

| 739,091 | 9/1903 | Larr | 114/235 A |
| 189,854 | 4/1877 | Fulton | 114/235 A X |

Primary Examiner—Trygve M. Blix
Attorney—Karl F. Ross

[57] ABSTRACT

A coupling for connecting two seagoing vessels comprises a turnbuckle extending between the vessels with opposite ends engaged by respective nuts articulated to a pair of shackles swingable in mutually orthogonal planes. One shackle is pivotally attached to an axially spring-loaded drawbar on one vessel. The free end of the other shackle has a crossbolt which slides in a vertical track mounted on the confronting side of the second vessel after insertion through a vertical slot in the track and subsequent rotation through 90°. The vessels can be drawn together by rotating the turnbuckle in such a way as to shorten the coupling.

9 Claims, 5 Drawing Figures

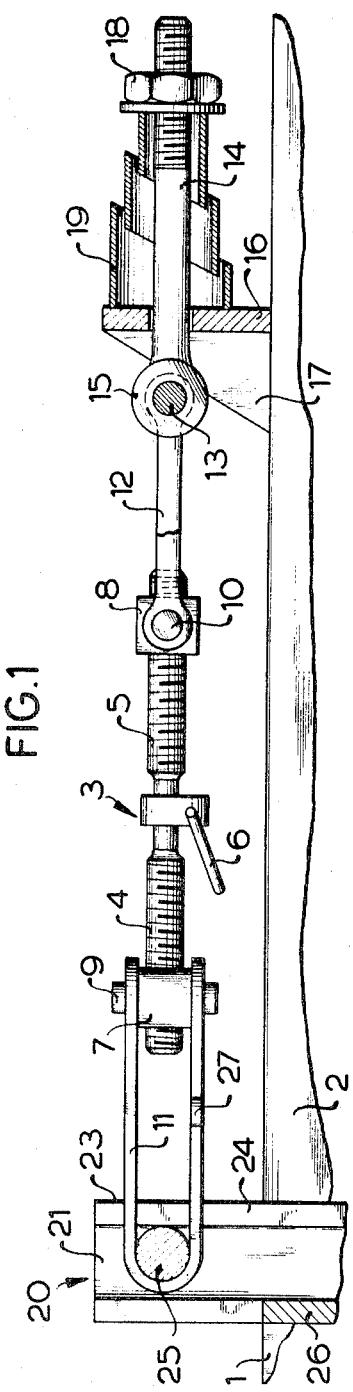
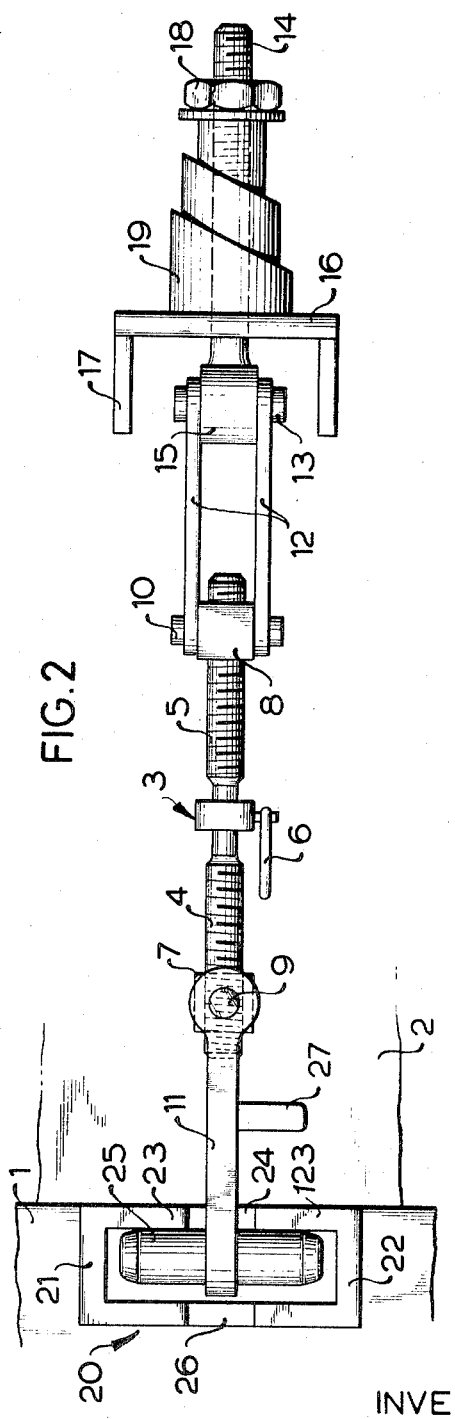

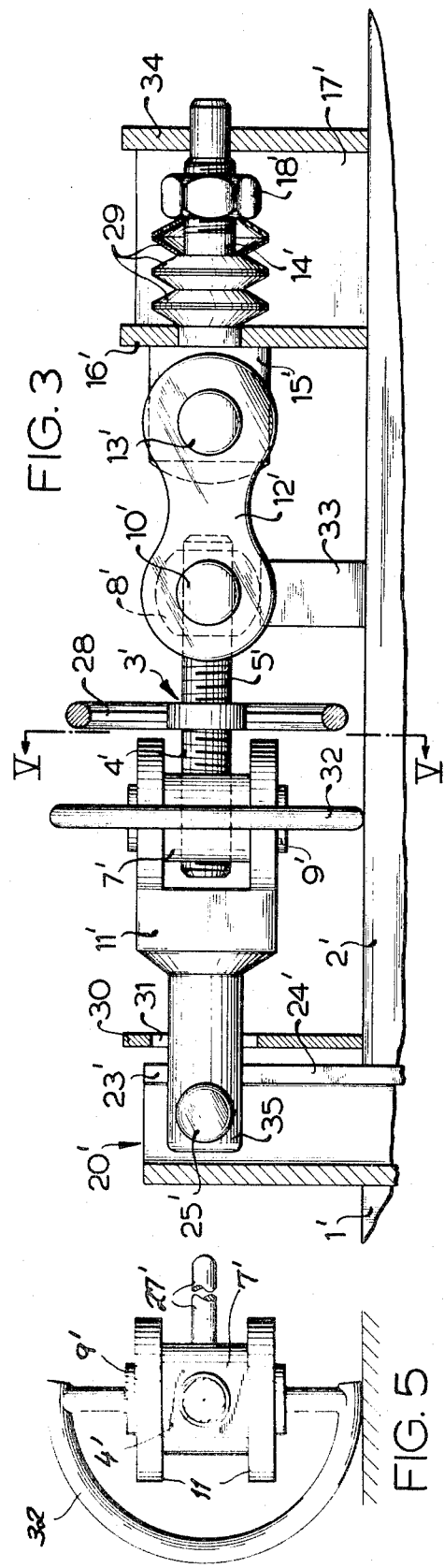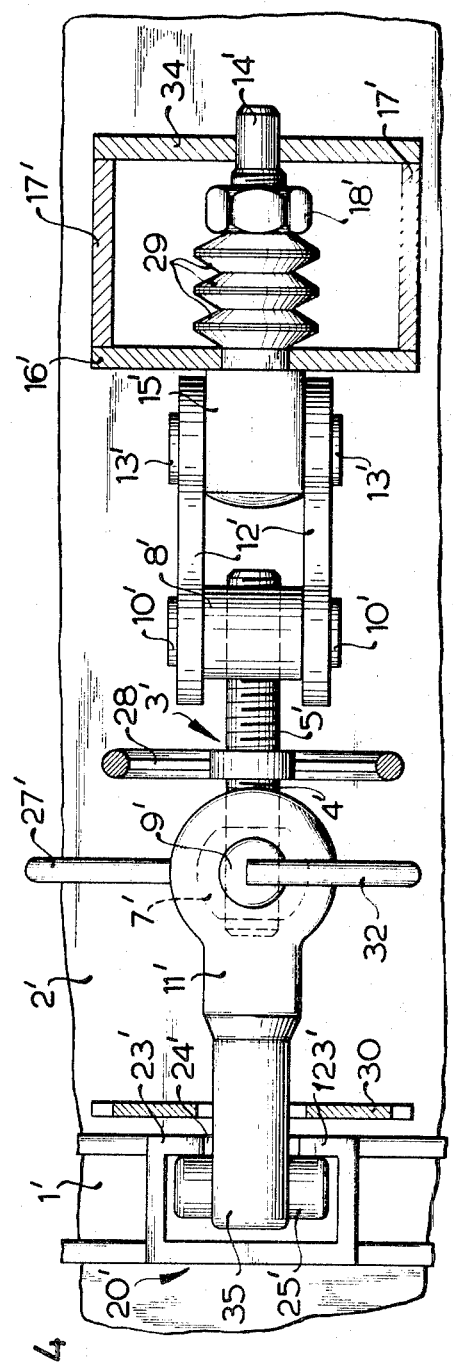

SPRING-LOADED COUPLING FOR SEAGOING VESSELS

My present invention relates to a coupling for releasably interconnecting two floating vessels, e.g. seagoing barges and/or tugs, for maneuvering or docking.

Especially in the case of seagoing vessels it is necessary to allow for major relative motion, both horizontal and vertical, of the floating bodies to be tied together. The use of cables, ropes or hawsers for this purpose is laborious and time-consuming since the cables etc. must be wound around and unwound from bollards or capstans aboard the vessel and must be sufficiently strong and numerous to withstand the stress. Mechanical couplings of a more rigid character, on the other hand, usually lack the accommodation necessary for a dependable connection with the requisite degree of relative mobility.

It is, therefore, the general object of my present invention to provide an improved and quick-acting coupling for releasably interconnecting such vessels, preferably with direct side-by-side or bow-to-stern contact therebetween.

A more specific object is to provide a coupling of this character whose parts can be left permanently emplaced, ready for use, on the two vessels upon separation thereof from each other.

The coupling according to my invention comprises, broadly speaking, a male part including a contractable linkage between two terminal assemblies, one terminal assembly being secured to the body of one vessel with freedom of at least limited motion in a vertical plane while the other terminal assembly, engaging the contractable linkage at a location remote from the first assembly, co-operates with complementary anchor means on board the other vessel for latching engagement therewith, the anchor means having a channel structure which serves as a female coupling part and has a vertical slot confronting the first vessel to receive a coacting formation of the second terminal assembly.

More particularly, the contractable linkage may be designed as a turnbuckle whose oppositely threaded extremities are engaged by respective nuts which are hinged to a pair of links forming part of the two terminal assemblies. The first link, advantageously, consists of two articulated members that are relatively swingable about a horizontal axis parallel to the hinged axis about which the member proximal to the turnbuckle pivots with reference to the associated nut; the more remote member may be guided in a fixed mounting which rises from the deck of the first vessel and against which it is axially stressed by one or more springs. The link forming part of the other terminal assembly carries a traverse element, such as a cross-pin, which is preferably skew to its own hinge axis and can be rotated within the channel of the anchor profile together with the associated nut into a generally horizontal latching position. The channel profile may be flush with the hull of the second vessel and may extend both above and below the waterline so as to form a track for the rolling or sliding of the cross-pin during relative rising and falling of the two decks. With the mounting for the first turnbuckle terminal set back by a sufficient distance from the edge of the first vessel, a tightening of the coupling by rotation of the turnbuckle will bring the two vessels into close contact with each other.

The above and other features of my invention will be described in detail hereinafter with reference to the accompanying drawing in which:

FIG. 1 is a side-elevational view, partly in section, of a ship coupling embodying the present improvement;

FIG. 2 is a top view of the coupling of FIG. 1;

FIG. 3 is a view similar to FIG. 1, illustrating a modification;

FIG. 4 is a view similar to FIG. 2 but relating to the embodiment of FIG. 3; and FIG. 5 is a cross-sectional view taken on the line V — V of FIG. 3.

In FIGS. 1 and 2 I have shown the decks 1 and 2 of two vessels to be temporarily interconnected by a coupling according to the invention. This coupling comprises a turnbuckle 3 with oppositely threaded extremities 4 and 5 and with a handle 6 facilitating rotation of the turnbuckle about its axis. Two nuts 7 and 8 are threaded onto the extremities 4 and 5 and are provided with pintles 9 and 10 swingably supporting a pair of yokes 11 and 12, respectively. The free ends of the arms of yoke 12 straddle a head 15 of a bolt 14 to which they are articulated by a pin 13 and which is horizontally slidable in a mounting 16 fixedly rising from the deck 2, this mounting being steadied against the deck by a pair of ribs 17. A buffer spring 19 bears upon the mounting 16 and upon a nut 18 on bolt 14 to tension the assembly 3, 12, 14 to the right as viewed in FIGS. 1 and 2.

The channel profile 20, comprising two confronting but spaced-apart U-beams 21 and 22, rises above the deck 1 of the other vessel and descends preferably below the waterline to the very bottom of its hull. This hull, as shown in FIG. 2, is flush with the flanges 23, 123 of beams 21 and 22 on the side of the vessel facing the deck 2 of the first vessel whereby these channels come into direct contact with the body of the latter vessel in the docking position shown in the drawing. The mutual spacing of the two beams 21 and 22 creates a forwardly facing slot 24 and its similar rearwardly facing slot, which, however, is sealed up to the level of deck 1 by a strip 26 to prevent the entry of water into the hull.

Yoke 11 carries a cross-pin 25 whose axis is orthogonal to that of pintle 9 and which can be inserted into the channel of profile 20, together with the free end of yoke 11, in its vertical position of alignment with slot 24. A lug 27 on yoke 11 enables rotation of the latter into the illustrated position in which pin 25 is horizontal and bears from behind upon flanges 23 and 123 to latch the assembly 11, 3, 12 to the structure 20. This insertion and rotation takes place with the two nuts 7 and 8 on turnbuckle 3 spaced apart by a distance greater than that illustrated so that the pin 25 can freely turn inside the channel; thereafter the turnbuckle is tightened with the aid of handle 6 to rigidify the connection. Owing to the resiliency of spring 19, however, this connection is still sufficiently yieldable to allow for limited horizontal excursions of either vessel relative to the other, with yoke 11 swinging about its fulcrum 9 whose axis is vertical in the operative position of the coupling. If the deck 1 rises or drops with reference to deck 2, turnbuckle 3 and link 11 can swing jointly about the horizontal fulcra 10 and/or 13; upon such relative vertical motion the pin 25 can also roll or slide on the track formed by the inner surfaces of flanges 23 and 123.

If desired, members 11, 3 and 12 may be secured against relative rotation by cotter pins or similar means known per se; an arrangement for positively retaining the pintle 10 in its horizontal position has been illustrated in FIGS. 3 and 4 and could also be used in the present embodiment.

In FIGS. 3 – 5, which show a generally similar coupling, I have designated elements analogous to those of FIGS. 1 and 2 by the same reference numerals but with the addition of a prime mark; these elements therefore need not be redescribed. Generally, the coupling of FIGS. 3 – 5 is somewhat more robust than that of the preceding embodiment so as to be suitable for heavier vessels. Profile 20' is here shown as a C-beam with bent-over flanges 23', 123' defining the access slot 24'. Also, the outer link 11' is here designed as a massive bifurcate member having a stem 35 cradled with play in an aperture 31 of a plate 30 rising from the deck 2' near its edge; upon the decoupling of the two vessels, therefore, this member is supported on plate 30 against downward pivoting on its fulcrum 9' whose axis is horizontal in the disengaged position. An additional support for the male unit 11', 3', 12' is provided in the form of a ring segment 32 which, as best seen in FIG. 5, is semiangular and secured to the gudgeons 9' constituting the pintle of nut 7', this ring segment acting as an arcuate bearing which braces the member 11' against the deck 2' in both its operative and inoperative positions. Lug 27' is rigid with nut 7' whereas handle 6 has been replaced by a handwheel 28 integral with turnbuckle 3'. Nut 10' is slidably supported on a block 33 fixed to the deck 2', this block being bracketed by the arms of yoke 12' which are thereby restrained against rotation about the turnbuckle axis. The mounting 16, 17 of FIGS. 1 and 2 has been replaced by a frame 16', 17' encasing the nut 18' on bolt 14' along with a set of Belleville springs 29 taking the place of buffer spring 19 of the preceding embodiment. The free end of bolt 14', finally, is slidably guided in a rear plate 34 of the mounting frame 16', 17'.

It will be apparent that the various supporting and bearing elements shown in FIGS. 3 – 5 may also be used, possibly in a modified form, with the construction of FIGS. 1 and 2 and that other parts of the coupling could likewise be given different shapes (e.g. yokes or shackles 11, 12 and drawbar 14).

Finally, the two vessels could also be provided with a second coupling representing an inverted replica of the first one, each vessel then carrying the male part 3, 11, 12 of one coupling and the female part 20 of the other coupling so that a particularly secure yet flexible connection between these vessels is realized upon joint engagement of the two male parts with their respective female counterparts. The two couplings could be disposed side-by-side or one above the other; in the latter instance, for example, the profile 20' shown in FIGS. 3 and 4 could be extended upwardly as a mounting (similar to frame 16', 17') for the second coupling whereas the similarly extended front plate 16' may have a vertical slot above bolt 14' to receive the cross-pin (corresponding to pin 25') of the second coupling.

I claim:

1. A coupling for interconnecting two floating vessels, comprising:
    first terminal means on board one of said vessels secured to the body thereof with freedom of at least limited motion in a vertical plane;
    a contractable linkage engaging said first terminal means;
    second terminal means engaging said contractable linkage at a location remote from said first terminal means; and
    anchor means on board the other of said vessels rigidly secured to the body thereof, said anchor means forming an upright channel with a vertical slot confronting said one of said vessels for latching engagement by said second terminal means;
    said linkage including a turnbuckle with oppositely threaded extremities and with a pair of nuts respectively engaging said extremities, said first terminal means including a first link hinged to one of said nuts for swinging about a first transverse axis, said second terminal means including a second link hinged to the other of said nuts for swinging about a second transverse axis.

2. A coupling as defined in claim 1 wherein said first link comprises a pair of articulated members relatively swingable about an axis parallel to said first axis, said first terminal means further including a mounting rigid with the body of said one of said vessels slidably supporting the member more remote from said turnbuckle.

3. A coupling as defined in claim 2 wherein said first terminal means further comprises spring means bearing upon said mounting and upon said more remote member for axially tensioning said links in a direction away from said other of said vessels.

4. A coupling as defined in claim 3, further comprising restraining means on said one of said vessels for preventing rotation of said first link from a position in which said first axis is substantially horizontal.

5. A coupling as defined in claim 4 wherein the member of said first link proximal to said turnbuckle is a yoke straddling the associated nut, said restraining means including a support for said associated nut bracketed by the arms of said yoke.

6. A coupling as defined in claim 2 wherein said second link is provided at an end remote from said turnbuckle with a transverse element skew to said second axis insertable through said slot into said channel and rotatable therein together with the associated nut for latching engagement.

7. A coupling as defined in claim 6 wherein said mounting rises from the deck of said one of said vessels and said second link is provided with an arcuate bearing member centered on said turnbuckle for supporting said second terminal means on said deck in different rotary positions of said transverse element.

8. A coupling as defined in claim 6 wherein said anchor means comprises a generally C-shaped profile with a pair of front flanges approaching each other to define said slot, said profile rising above the deck and below the waterline of said other of said vessels.

9. A coupling as defined in claim 8 wherein said other of said vessels has a hull flush with said flanges, said mounting being set back on the deck of said other of said vessels by a distance sufficient to let said hull come to rest against the body of said one of said vessels upon a tightening of said turnbuckle with engagement of said profile by said transverse element.

* * * * *